(12) United States Patent
Tuli

(10) Patent No.: US 6,362,902 B1
(45) Date of Patent: Mar. 26, 2002

(54) PORTABLE APPARATUS AND METHOD FOR READING A DOCUMENT

(76) Inventor: Raja S. Tuli, 1155 Rene Levesque West #3500, Montreal QC (CA), H3B 3T6

( * ) Notice: Subject to any disclaimer, the term of this patent is extended or adjusted under 35 U.S.C. 154(b) by 0 days.

(21) Appl. No.: 09/414,103

(22) Filed: Oct. 7, 1999

(51) Int. Cl.⁷ .............................................. H04N 1/024
(52) U.S. Cl. ...................................... 358/473
(58) Field of Search ................................. 358/473, 474, 358/496, 498, 472, 471, 482, 483, 505, 506, 400, 408; 382/313; 250/208.1

(56) References Cited

U.S. PATENT DOCUMENTS 5,739,923 A * 4/1998 Kawahara ................... 358/473
5,865,431 A * 2/1999 Ma ............................ 358/473

* cited by examiner

Primary Examiner—Cheukfan Lee

(57) ABSTRACT

The present invention relates to a reading device for reading data on a document. It is substantially rectangular, and the length is approximately equal to the width of a standard sheet of paper. The device is readily portable because it is equipped with a clip, therefore it may be secured onto a shirt pocket, and as well it is equipped with a hinge assembly, therefore it may be folded, and easily carried inside a pocket or a wallet. The invention provides a user with numerous scanning options because the device may be used in its fully open position or in its folded position.

4 Claims, 6 Drawing Sheets

PORTABLE APPARATUS AND METHOD FOR READING A DOCUMENT

BACKGROUND OF THE INVENTION

The field of the present invention generally relates to a data reading apparatus. Prior art includes all portable, scanning devices, such as the CapShare by Hewlett-Packard. However, the present invention differs from other portable scanning devices in that a hinge assembly renders it foldable, therefore heightening its portability and utility. Multiple scanning options are available to the user because of the hinge assembly, and rendering it markedly different from any other devices.

SUMMARY OF THE INVENTION

The present invention relates to a method and apparatus for reading media such as a document bearing text or images. The heart of the invention is a readily portable device for reading documents, which may be folded by means of a hinge assembly mounted in the center of the length of the device. The hinge assembly heightens the compactness and portability of the device, and provides the user with multiple scanning position options.

In a preferred embodiment, a plurality of reading mechanisms are assembled in a module that is substantially rectangular. The length of the module is approximately the width of a standard sheet of paper. The reading mechanisms are positioned along the long length of the module such that the reading method comprises pressing the module across a document to be read and manually moving the module in the direction desired. A clip that is closed at a superior end and open at an opposite end is attached to the module such that the clip may straddle a pocket attached to clothing. The utility of the clip mechanism is to render the module portable.

A hinge assembly mounted vertically in the center of the length of the device rotatably connects the halves of the module, and allows the module to be folded. The hinge assembly provides two scanning positions: one when the device is folded and the other when the device is straight. In a folded position, the reading mechanisms lie parallel to each other, and in a straight position, the reading mechanisms are in a linear array. A locking device allows the module to be secured into place either when the module is folded or straight.

The scanner is equipped with an internal memory mechanism such that all information may be downloaded into a computer at a later time.

In another embodiment, the device is bisected obliquely, and a hinge assembly rotatably connects the halves. In a straight position, the reading mechanisms are positioned in a substantially linear array, but the angle of the division causes the reading mechanisms to overlap. However, the perpendicular direction of traversing the device across a document ensures that no information is lost. In a folded position, the reading mechanisms are parallel to each other.

In a further embodiment, the hinge assembly is mounted across the width of the device such that in a folded position the reading mechanisms are facing each other. In a folded position, scanning occurs when a document is slid in between the reading mechanisms. Thus, double-sided scanning is possible.

BRIEF DESCRIPTION OF THE DRAWINGS

The invention is described in more detail below with respect to an illustrative embodiment shown in the accompanying drawings in which.

DETAILED DESCRIPTION OF THE PREFERRED EMBODIMENTS

The preferred embodiments will now be described with respect to the drawings. To facilitate description, any numeral identifying an element in one figure will represent the same element in any other figure.

Figure 1:
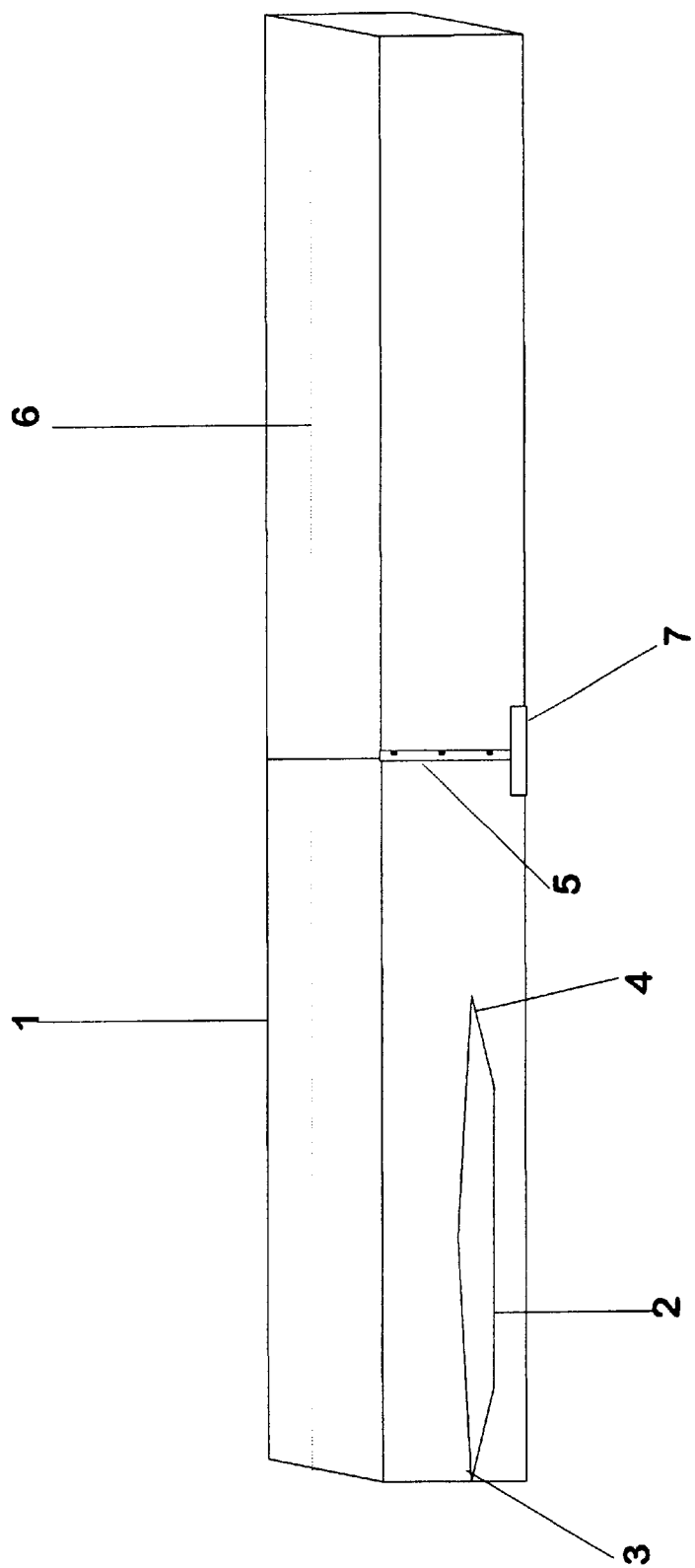
FIG. 1 illustrates the reading device in an open position.

In a first embodiment of the present invention, FIG. 1 illustrates a foldable reading device 1. The device is substantially rectangular, go compact and lightweight so as to be easily manipulated by the user, and houses a plurality of reading mechanisms necessary for a contact image sensor type scanner. A clip 2 is displayed which is closed at a superior end 3, and open at an opposite end 4. The open end enables the user to straddle the light pen onto a pocket attached to clothing. Thus, the reading device is easily portable and may be securely carried anywhere.

The length of the device, in its fully opened position, is approximately the width of a standard sheet of paper. A standard sheet of paper is defined as having dimensions of 8 ½ ×11 inches, thus the device is approximately 8 ½ ×11 inches long. Therefore, in its folded position, the device is approximately half this size. The length is the largest dimension of the device and the clip lies parallel to the length. A plurality of solid state devices are arranged along the length of the device such that the entire length of a line of a page may be read and converted to a digital image.

Reading occurs upon the user placing the device flat across the surface of the document to be read and manually moving it in the direction desired. The solid state elements read the full width of each line as the device is traversed. The device is equipped with a battery. In that the device is a hand-held unit, an internally disposed electrical source is required for desired operation.

Folding and opening the device is realized by means of a hinge assembly 5 that is mounted vertically on the device. The hinge assembly divides the module into two equal parts and rotatably connects the halves. When the device is in its fully opened position, the reading mechanisms 6 are fixed in a linear arrangement. In the fully opened position, a locking mechanism 7, serves to hold the halves together in one straight, unitary device.

Figure 2:
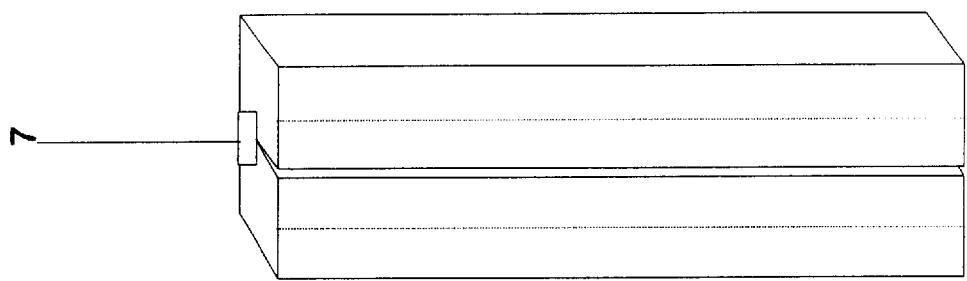
FIG. 2 illustrates the reading device in a folded position.

Conversely, when the device is in its folded position, as shown in FIG. 2, the halves are fixed alongside each other, and the reading mechanisms are positioned parallel to each other. The locking mechanism 7 secures the halves in the folded state.

The utility of the reading device is heightened because of the hinge assembly. The hinge assembly provides numerous scanning options and advantages for using the device. First, in its fully opened position, a user may easily scan the full width of a standard sheet of paper. Second, its folded position provides the user with a simple way to scan smaller documents, such as business cards or receipts. The folded position also renders the device compact, and readily portable in a shirt pocket or wallet.

Figure 3:
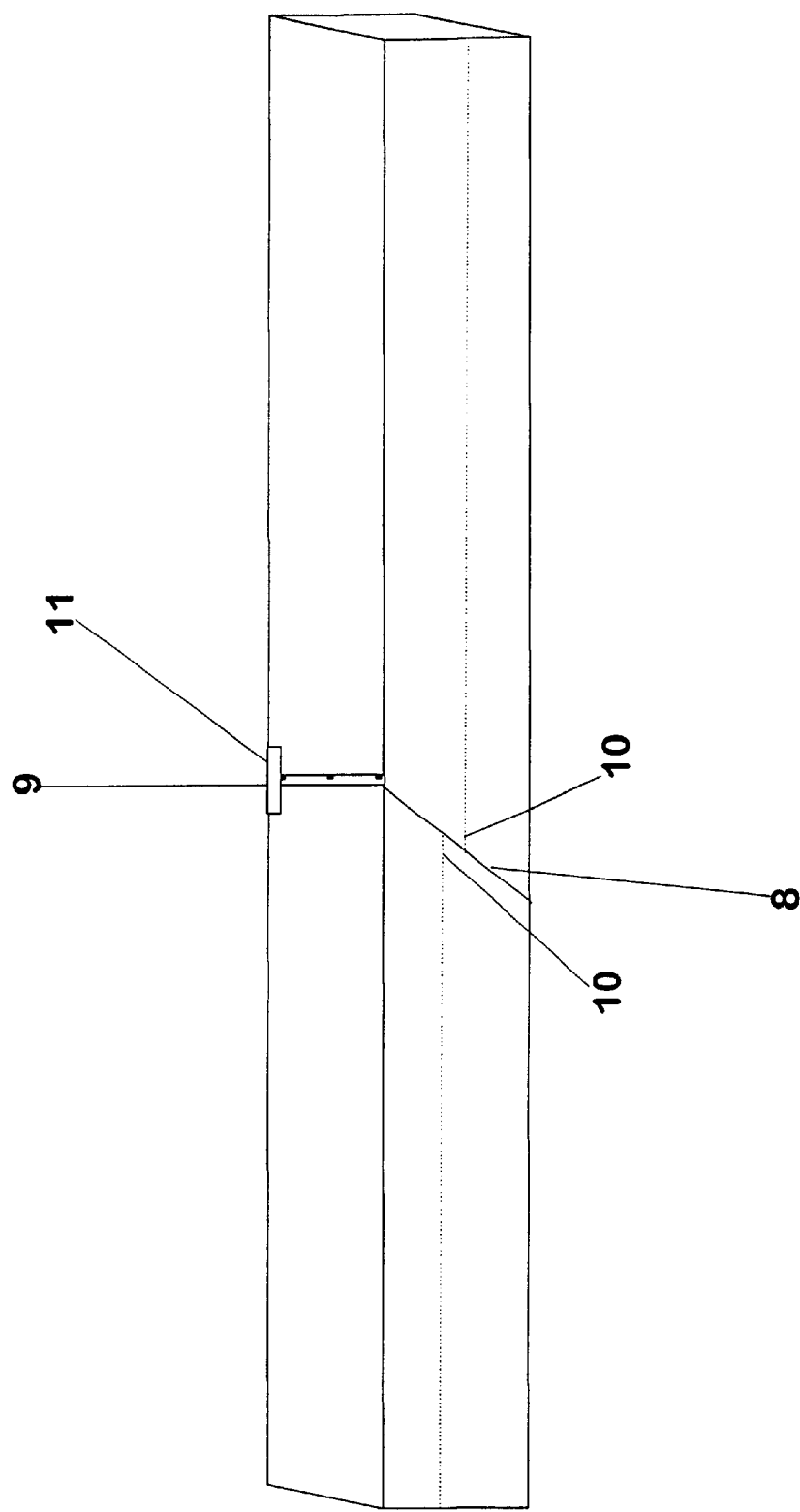
FIG. 3 displays the reading device bisected obliquely.

In another embodiment of the present invention, as illustrated in FIG. 3, the device is bisected obliquely 8, and the halves are rotatably connected by means of a hinge assembly 9. In a fully opened position, the reading mechanisms are arranged in a substantially linear array, but the angle of the division causes the reading mechanisms 10, to overlap each other, as shown. Thus, the scan lines are parallel. However, no information is lost because to scan a document the device is traversed across a document such that the reading direction is perpendicular to the alignment of the reading mechanisms. The data is stored in the memory, and subsequently downloaded into a computer, where the image will be adjusted such that a complete representation of the original image is created. A locking mechanism 11 secures the halves in a straight, unitary device.

Figure 4:
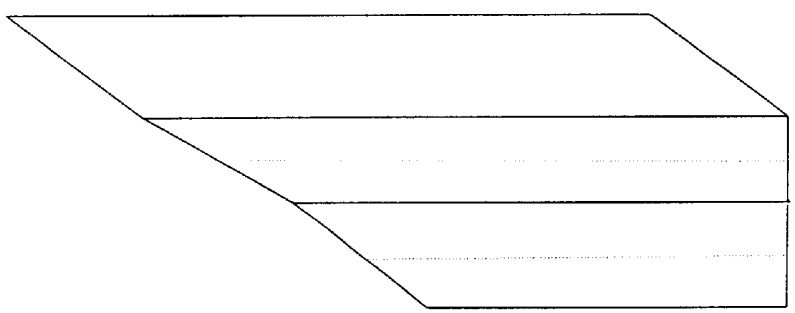
FIG. 4 displays the reading device bisected obliquely and folded.

In a folded position, the reading mechanisms lie parallel to each other, as shown in FIG. 4, and the halves are fixed alongside each other by means of the locking mechanism 11.

Figure 5:
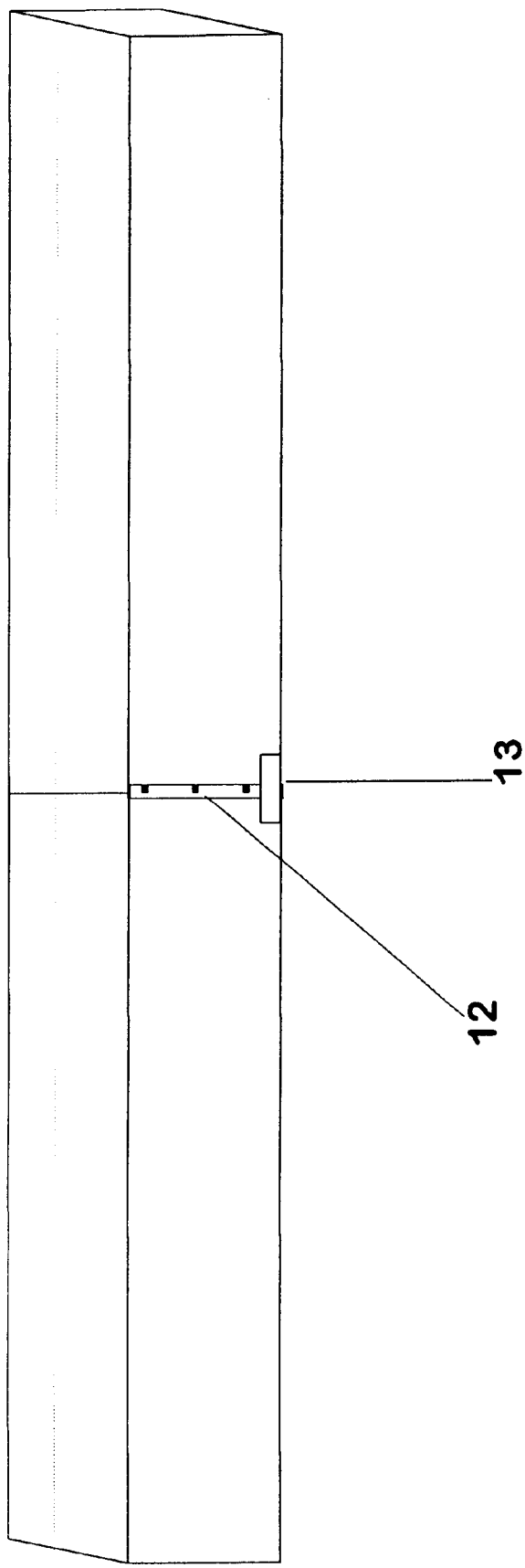
FIG. 5 depicts the reading device in an open position.

In a further embodiment of the present invention, as illustrated in FIG. 5 the hinge assembly 12 is mounted vertically on the device, rotatably connecting the halves. A locking mechanism 13 secures the device in a fully opened position, or in a folded position. In a fully opened position, the device is fixed in a straight line, and the reading mechanisms are in a linear array.

Figure 6:
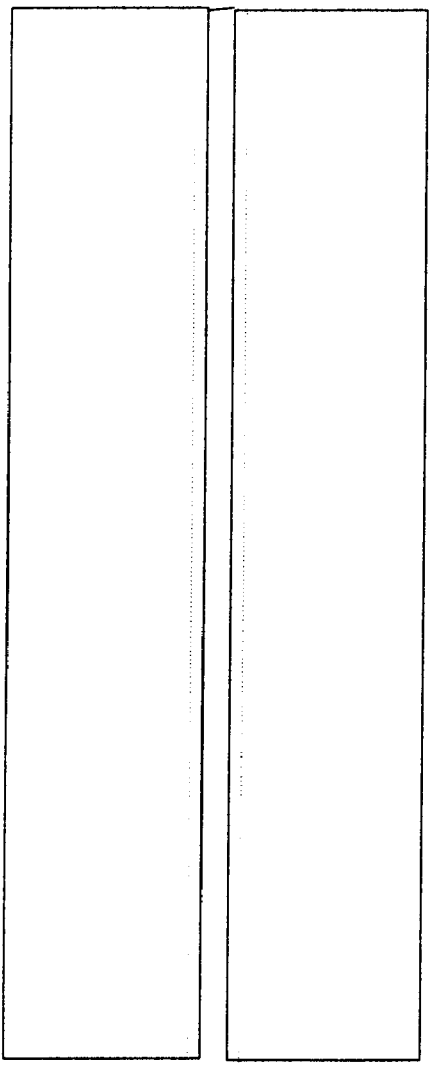
FIG. 6 depicts the reading device in a folded position with the reading mechanisms facing each other.

The hinge assembly is mounted such that in a folded position, the halves of the device are in a parallel alignment, and the reading mechanisms face each other, as illustrated in FIG. 6. In a folded position, this arrangement of the reading mechanisms further increases the utility of the present invention by providing a double-sided scanning capability. It is possible for a user to scan both sides of a document simultaneously.

The invention has been described in detail with particular reference to the preferred embodiments thereof, but it will be understood that variations and modifications can be effected within the spirit and scope of the invention.

I claim:

1. An apparatus for reading a document comprising:

a hinge assembly mounted vertically on a reading device such that the halves of said device are rotatably connected, each half containing a linear reading mechanism;

in a folded position, the halves of the device are secured alongside each other, and the reading mechanisms are parallel to each other.

2. An apparatus for reading a document, as claimed in claim 1 further comprising:

reading mechanisms which overlap each other;

the direction of traversing the reading device is perpendicular to the reading mechanisms.

3. An apparatus for reading a document, as claimed in claim 1 further comprising:

in a folded position, the halves of the device are secured alongside each other, such that the reading mechanisms are facing each other.

4. An apparatus for reading a document, as claimed in claim 1 further comprising:

a clip that lies parallel to the scan line, comprising an open end and a closed end such that the clip may straddle a pocket.

* * * * *